# United States Patent Office 2,889,988
Patented June 9, 1959

2,889,988

MEANS FOR CORRECTING POTENTIOMETER LOADING ERRORS IN ANALOG COMPUTER CIRCUITS

William E. Toth and John M. Hunt, Binghamton, N.Y., assignors to Link Aviation, Inc., Binghamton, N.Y., a corporation of New York Application December 2, 1955, Serial No. 550,674

9 Claims. (Cl. 235—184)

This invention relates to improvements in analog computer circuits, and more particularly to means for increasing the accuracy of analog computer multiplication apparatus wherein it is desired to produce an electrical potential output commensurate with the product of an input electrical potential quantity and a mechanical shaft input quantity.

In the arts of electrical instrumentation, automatic control, and analog computation, variable potentiometers are extensively employed to derive electrical potentials representative of angular shaft positions. It is a common practice to combine a plurality of such derived potentials through electrical summing circuits, as for example by applying various potentials simultaneously to the input circuit of an operational summing amplifier. The details of such amplifier circuits are well known in the prior art and need not be further described herein, except to note that under this procedure, generally known as parallel addition, the input grid of the summing amplifier is, because of feedback action, constrained to a potential very nearly equal to ground potential. Any difference in potential between the input circuit of the operational amplifier and the output potential derived from the variable potentiometer will cause a load current to flow through the finite impedance of the potentiometer winding and thereby produce an additional potential drop across at least a portion of the potentiometer. This load current potential drop at the potentiometer introduces an erroneous relation between the derived potential and the shaft position quantity. For example, if the impedance of the potentiometer winding is linear throughout its length, the output potential derived therefrom should be directly proportional to the wiper shaft position, but in practice heretofore this has not been the case because of the potential errors caused by the potentiometer loading currents.

In application Serial No. 397,516, filed December 11, 1953, now Patent No. 2,769,102, by Monson H. Hayes, and assigned to the same assignee as the present application, a method is disclosed for solving this problem by eliminating the unwanted potentiometer loading current. Practice of this prior invention requires the use of at least one additional stage of amplification. The present invention represents a different approach to the problem, which may be considered an improvement, in that by our invention the error producing load currents are not eliminated but instead a compensating potential is automatically derived from an auxiliary potentiometer and simultaneously combined with the potential derived by shaft operation upon the main potentiometer, to compensate for and correct the loading current error potentials.

Accordingly it is an object of the invention to provide improved means for correcting variable potentiometer loading errors.

Another object of the invention is to provide means automatically compensating for load current error potentials in potentiometer circuits.

A general object of the invention is to improve the accuracy of analog computer circuits.

A more particular object of the invention is to provide improved means for producing an electrical potential output commensurate with the product of an input electrical potential quantity and a mechanical shaft input quantity.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
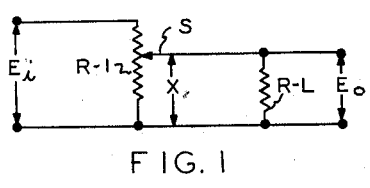
Fig. 1 is a simple schematic diagram useful in understanding the theory of the invention.
Figure 2:
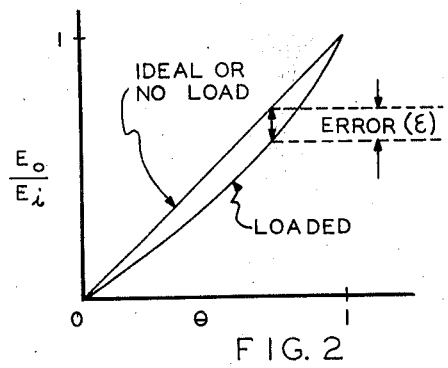
Fig. 2 is a graphic diagram illustrating the error potentials for which the invention compensates.

Referring now to Fig. 1 and Fig. 2 of the drawings the relation between potentiometer shaft position and potentiometer loading error will be described, and the shaft position at which maximum loading error occurs may be determined. As annular potentiometers having wiper arms driven by rotary shafts are the type most commonly used, shaft position may be defined as angle of rotation $\theta$, although it is to be understood that the same considerations apply equally to linear operated wiper shafts, in which case $\theta$ may be expressed in terms of percentage of total shaft travel. In Fig. 1 $E_i$ represents input voltage applied across a potentiometer (not necessarily a linear potentiometer) of impedance R. $E_o$ represents output voltage from potentiometer R applied across a load of finite impedance $R_L$, and to simplify the drawing it has been assumed that the potentiometer is linear. For any given position X of potentiometer shaft S, $E_o$ will have a maximum value when no load is applied to potentiometer R (i.e., when $R_L$ equals infinity), and will have a lesser value when the potentiometer is loaded by connection to a finite impedance $R_L$. By subtracting $E_o$ with the potentiometer R loaded as shown in Fig. 1 from $E_o$ when the potentiometer R is unloaded, the error may be expressed as:

$$E = \frac{-\theta^2(1-\theta)}{R_{L/R} + \theta(1-\theta)} E_i \qquad (1)$$

where $\theta$ is the shaft position as represented graphically in Fig. 2.

By mathematical re-arrangement of Expression 1 and considering the per unit value of E; we get:

$$E \frac{R_L}{R} = \frac{-\theta^2(1-\theta)}{1 + \theta \frac{(1-\theta)}{R_{L/R}}} \qquad (2)$$

In most computer applications the ratio of $R_L$ to R is much greater than 10, $$\frac{R_L}{R} \gg 10$$

therefore $$\frac{\theta(1-\theta)}{R_{L/R}} \ll 1$$

and the denominator of Expression 2 becomes approximately equal to one, thus:

$$E\left(\frac{R_L}{R}\right) = -\theta^2(1-\theta) \quad (3)$$

By taking the derivative of (3) with respect to $\theta$ we get $$\frac{dE\left(\frac{R_L}{R}\right)}{d\theta} = -2\theta + 3\theta^2 \quad (4)$$

By setting the differential to zero and solving Expression 4 for $\theta$, we determine the position of the potentiometer shaft at which maximum loading error occurs:

$$-2\theta + 3\theta^2 = 0$$
$$\theta = \frac{2}{3} = 0.667 \text{ total shaft travel}$$

The above reasoning applies to the maximization of the absolute magnitude of error. The greatest percentage error occurs at the point of maximum source impedance ($\theta = .5$ total travel). Furthermore, the reasoning is directly applicable only to linear potentiometers. For non-linear potentiometers, it is only necessary to substitute in the computations percent resistance from one end of winding for the variable $\theta$, since angular shaft position is not a direct measure of resistance in non-linear potentiometers.

Figure 3:
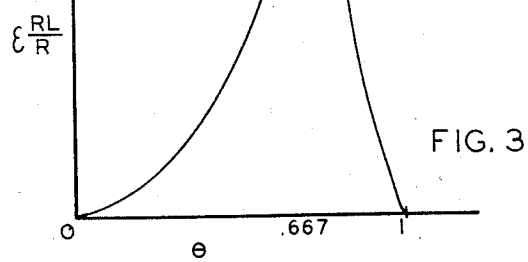
Fig. 3 is a graphic diagram illustrating the variations in error potential with respect to potentiometer shaft position.

The above relation of absolute magnitude of loading error with respect to shaft position is plotted graphically in Fig. 3 of the drawings.

The invention corrects this loading error by providing a compensating potential which follows the error potential, varying accordingly with shaft displacement, and which is combined with the output voltage from an operational potentiometer to produce a derived potential of the desired characteristics, substantially free from loading current errors.

Figure 4:
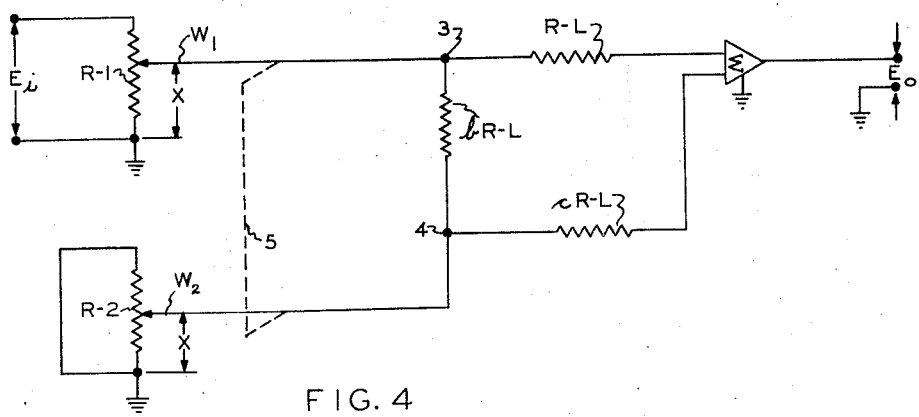
Fig. 4 is a schematic diagram of a simplified embodiment of the invention useful for reducing potentiometer loading errors to a negligible value; and, Fig. 5 is a schematic diagram of an alternative embodiment of the invention affording even greater accuracy and more complete compensation for potentiometer loading errors.

A simplified embodiment of the invention is illustrated by Fig. 4 of the drawings which represents a schematic diagram of a circuit whereby the above noted potentiometer loading errors may be substantially reduced to a negligible value. In Fig. 4, $R_1$ represents an operational potentiometer adapted to have an input voltage $E_i$ applied thereacross. A wiper arm $W_1$ of potentiometer $R_1$ is connected through a fixed resistance $R_L$ to the input circuit of an operational amplifier $\Sigma$ which may be a conventional summing amplifier. An auxiliary potentiometer $R_2$, which should preferably have substantially the same impedance characteristics as $R_1$ but need not be of the same quality nor manufactured to the same precision tolerances as $R_1$, has its wiper arm $W_2$ connected to the input circuit of amplifier $\Sigma$ through a fixed resistance $cR_L$. The opposite ends of the potentiometer winding $R_2$ are connected to ground and thereby to one end of potentiometer $R_1$. Between terminals 3 and 4 of wipers $W_1$ and $W_2$, respectively, a fixed resistor $bR_L$ is connected whereby potentiometer $R_2$ is energized by the potential derived at wiper $W_1$ of potentiometer $R_1$. $c$ and $b$ are constants equal to one-half and unity, respectively. Potentiometers $R_1$ and $R_2$ have their wiper shafts $W_1$ and $W_2$ ganged for synchronous operation, as indicated by the broken line 5. Thus the wipers $W_1$ and $W_2$ are always displaced by an equal angle (or distance of travel) X. By this circuit arrangement it will be noted that the potential appearing at wiper $W_2$ of potentiometer $R_2$ will be zero whenever X is either at its maximum or minimum values, and the potential at $W_2$ will rise to a maximum value when X is at a median value, i.e. when wiper $W_2$ is located at its mid position. Thus the potential at terminal 4 in Fig. 4 varies with each change in the value of X and is at all times approximately equal to the potential drop at terminal 3 caused by load currents flowing through wiper $W_1$ of potentiometer $R_1$. That this is true will be apparent to one skilled in the art upon the full consideration of the more important physical aspects of the circuitry of Fig. 4 and their practical significance. For example, potentiometers $R_1$ and $R_2$ have been described as having substantially the same impedance characteristics except that $R_2$ need not be of the same precision tolerance as $R_1$. Moreover each of the wipers $W_1$ and $W_2$ have been described as physically ganged for identical displacement X and the instances $R_L$, $bR_L$ ($R_1$) and $cR_L$ $$\frac{(R_L)}{2}$$

have been selected to have resistance values of considerably more than ten times the resistance value of $R_1$ or $R_2$. Also according to the well known operating characteristics of operational amplifiers the junction of resistances $R_L$ and $cR_L$ may be considered as being maintained at ground potential. Further, on the basis that internal resistance of voltage sources like $E_i$ may be considered zero for some purposes without substantial error in equivalent circuits, it follows that the equivalent resistance of each of ganged potentiometers $R_1$ and $R_2$ will remain the same regardless of the value of the shaft displacement X. Since the potentiometer loading error component E of potentiometer $R_1$ output potential appearing at terminal 3 may always be calculated as equal to the current passing through wiper $W_1$ multiplied by the equivalent resistance of potentiometer $R_1$, and the equivalent resistance values of $R_1$ and $R_2$ are always equal, the potential appearing at terminal 4 may be determined by the current passing through wiper $W_2$ and the equivalent resistance of potentiometer $R_2$ to ground. Because of the relative values of the resistances of $R_L$, $bR_L$, $cR_L$ and $R_2$, it should be apparent that approximately one-half of the current appearing at terminal 3 from source $E_i$ will pass through $R_2$, thereby determining the potential at terminal 4 as one-half of the loading error potential E. Therefore, since the scaling resistance $cR_L$ is one-half of the value of $R_L$, it will be apparent that the operational amplifier receives a potential commensurate with $XE_i - E$ from terminal 3 and a potential commensurate with E from terminal 4 for summation, thereby providing a substantially loading error-free output potential commensurate with $XE_i$ in accordance with the present invention. This potential at terminal 4 is applied through fixed resistor $cR_L$ to the input of operational amplifier $\Sigma$ where it is added to the potential appearing at terminal 3 to compensate for the loading current potential errors of potentiometer $R_1$. The magnitude of this compensating potential varies directly with the load current potential drop in such a manner that the sum of the two input voltages fed into amplifier $\Sigma$ through resistor $R_L$ and through resistor $cR_L$ produces an effect closely equivalent to that which would be applied through $R_L$ alone in the absence of the potentiometer loading effect described above.

As shown above, the circuit of Fig. 4 which requires only one additional potentiometer and two fixed resistors, none of which are of critical values, may be employed to reduce the loading errors of an operational potentiometer to a negligible value. If more complete correction is desired, for even greater accuracy of correspondence between mechanical shaft position and derived electrical potential, the fundamental circuit of the invention may be modified as shown in Fig. 5.

Figure 5:
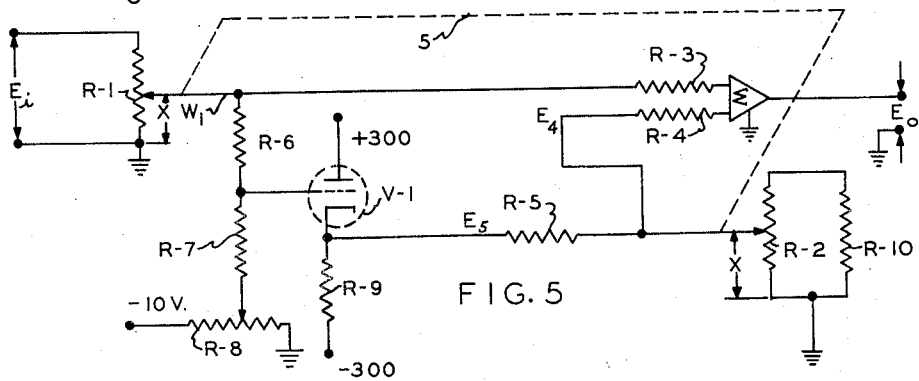

Referring now in greater detail to Fig. 5 of the drawing, $E_i$ represents an input voltage applied across the winding of an operational potentiometer $R_1$ from which it is desired to derive an output voltage as a function of mechanical displacement of wiper shaft $W_1$. $R_2$ is an auxiliary potentiometer of substantially the same impedance characteristic as $R_1$, though not necessarily of the same precision quality. The wiper shaft $W_2$ of potentiometer $R_2$ is mechanically ganged to shaft $W_1$ of $R_1$ by a suitable coupling 5 so that both shafts are movable simultaneously through angle, or distance, X. The wiper $W_1$ of potentiometer $R_1$ is connected to the input of amplifier $\Sigma$ through a scaling resistor $R_3$, while the wiper $W_2$ of potentiometer $R_2$ is connected to the input of amplifier Σ through a scaling resistor $R_4$. Potentiometer $R_2$ is energized by connection of wiper $W_2$ through fixed resistor $R_5$ to the cathode follower tube $V_1$. Resistors $R_3$, $R_4$ and $R_5$ have identical resistance values. The control grid of tube $V_1$ is connected through a fixed resistor $R_6$ to the wiper $W_1$ of potentiometer $R_1$, and also through another fixed resistor $R_7$ and a variable resistor $R_8$ to a source of negative bias potential. This connection through resistors $R_7$ and $R_8$ provides a small compensation for bias error in the cathode follower $V_1$, to increase the accuracy of the device shown in Fig. 5. This bias circuit may be omitted if a drift-free unity gain amplifier is substituted for the simple cathode follower $V_1$ illustrated in Fig. 5. The voltage at the cathode of $V_1$ is a reasonably faithful replica of the voltage at the slider of potentiometer $W_1$. Since potentiometers $R_1$ and $R_2$ are driven in synchronism and are functionally identical to one another, it is apparent that the impedance of potentiometer $W_1$ looking back into the wiper terminals exactly corresponds at all times to the impedance between the wiper of potentiometer $R_2$ and ground. Thus, potentiometer $R_2$ is a faithful replica of the source impedance which gives rise to loading error when resistor $R_3$ is connected to potentiometer $R_1$. Since resistor $R_5$ has the same resistance as $R_3$, it will be seen that the potential at the junction of $R_5$ and the slider of potentiometer $R_2$ corresponds (to a very close approximation) to the magnitude of the potential drop caused by load current flowing through the source impedance of potentiometer $R_1$. This statement is true, of course, only if the voltage divider combination $R_5/R_2$ is excited by a voltage equal to that at the slider of potentiometer $R_1$; thus equality is guaranteed through the use of the cathode follower. The voltage at the slider $W_2$ is introduced into the amplifier through resistor $R_4$. Since the gain of the cathode follower will be slightly at less than unity, the corrective voltage is slightly undersized. Furthermore, the combination of resistors $R_6$, $R_7$ and $R_8$, introduced to provide compensation for cathode follower bias offset, causes the load resistance applied to potentiometer $R_1$ to be slightly lower than the actual resistance $R_3$. The combination of these two effects can be corrected by reducing the value of resistor $R_4$ or $R_5$. Either of these expedients will increase the magnitude of the corrective signal to compensate for the secondary errors previously described.

It will be noted in Fig. 5 that the winding of auxiliary potentiometer $R_2$ is shunted by a fixed resistor $R_{10}$; the purpose of this resistor is to provide compensation for non-zero source impedance in the circuit which drives potentiometer $R_1$. The impedance of $R_{10}$ should preferably be approximately equal to impedance of the source driving potentiometer $R_1$. It is to be understood that the use of a fixed shunt resistor, as $R_{10}$, is a circuit refinement which may be added to the simplified circuit of Fig 4 if desired, or that $R_{10}$ may be omitted from the circuit of Fig. 5 and the opposite ends of auxiliary potentiometer $R_2$ may be connected together and directly to ground if the source impedance of main potentiometer $R_1$ is quite low, of if the required degree of computational accuracy does not necessitate correction of the very small error produced by loading of the source impedance.

In precision applications where the invention may be most useful, as for example in precise analog computation, the ratio of resistance $R_3$ to $R_1$ is generally quite high, of the order of 100:1 in many instances, and consequently the amount of correction required is small, although of very great significance. Errors in the accuracy of the corrective circuits and the components therein merely introduce second order errors in the derived output voltage, or, in effect, very small errors in the magnitude of a corrective term which in itself is quite small. Accordingly, great precision is not required in the circuitry of the invention to obtain a material improvement in over-all system accuracy. The relative values of resistors $R_3$, $R_4$, $R_5$ and potentiometers $R_1$ and $R_2$ can be varied in either circuit, provided the proper relationships are maintained. If $R_3$ is very much greater than $R_1$, negligible error is introduced by altering the value of resistor $R_5$. For example, the value of resistance $R_5$ may be reduced to one-half the value of resistor $R_3$, if the value of resistor $R_4$ is increased two-fold. Similarly, the value of resistor $R_2$ can be altered with respect to the value of $R_1$, although it may be considered preferable to select these two potentiometers of equal value.

It will be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A circuit for correcting variable potentiometer loading errors comprising in combination, a first variable potentiometer adapted to have an input potential connected across opposite ends thereof, a variable output member movable between opposite ends of said potentiometer, a second variable potentiometer having an output member movable between opposite end thereof, means electrically connecting opposite ends of said second potentiometer to one end of said first potentiometer, means for electrically exciting said second potentiometer by an output potential from said first potentiometer, and means electrically connecting the output members of said first and second potentiometers to a common load.

2. The combination of claim 1 in which the impedance of said second potentiometer is substantially equal to the impedance of said first potentiometer.

3. The combination of claim 1 in which opposite ends of said second potentiometer are connected to one end of said first potentiometer through impedance means.

4. The combination of claim 1 in which the variable members of said first and second potentiometers are mechanically ganged for concurrent operation.

5. The combination of claim 1 in which the output members of said first and second potentiometers are connected to the input circuit of an operational amplifier.

6. The combination of claim 1 in which the impedances of said first and second potentiometers are substantially equal and the opposite ends of said second potentiometer are connected across a fixed impedance.

7. The combination of claim 1 in which the impedances of said first and second potentiometers are substantially equal and the movable members of said potentiometers are mechanically ganged for simultaneous operation.

8. Analog computer multiplication apparatus for providing an output potential commensurate with the product of an input potential quantity and a shaft input quantity comprising in combination, a main potentiometer having its windings connected for excitation by said input potential quantity and its wiper arm adapted to be positioned by said shaft input quantity, a summing amplifier having finite input circuit impedance, circuit means connecting the output potential from said main potentiometer to the input circuit of said amplifier whereby said amplifier input impedance constitutes a load on said main potentiometer introducing an error in the output potential from said main potentiometer, an auxiliary potentiometer having its windings excited by said output potential from said main potentiometer and its wiper arm positioned by said shaft input quantity to produce a loading error compensation potential, means connecting opposite ends of said auxiliary potentiometer winding to one end of said main potentiometer winding, and circuit means connecting said compensation potential from said auxiliary potentiometer to the input circuit of said summing amplifier.

9. Analog computer multiplication apparatus for providing an output potential commensurate with the product of an input potential quantity and a shaft input quantity comprising in combination, a main potentiometer having its winding connected for excitation by said input potential quantity and its wiper arm adapted to be positioned by said shaft input quantity, a summing amplifier having finite input circuit impedance, circuit means connecting the output potential from said main potentiometer to the input circuit of said amplifier whereby said amplifier input impedance constitutes a load on said main potentiometer introducing an error in the output potential from said main potentiometer, an auxiliary potentiometer having its winding excited by said output potential from said main potentiometer and its wiper arm positioned by said shaft input quantity to produce a loading error compensation potential, means connecting opposite ends of said auxiliary potentiometer winding to a fixed impedance, further means interconnecting corresponding portions of the windings of said main and auxiliary potentiometers, and circuit means connecting said compensation potential from said auxiliary potentiometer to the input circuit of said summing amplifier whereby potentials from said auxiliary potentiometer are combined with corresponding potentials from said main potentiometer to compensate for said error in the output potential of said main potentiometer produced by the load currents drawn therefrom through the input impedance of said amplifier.

References Cited in the file of this patent

UNITED STATES PATENTS

| | | |
|---|---|---|
| 2,194,456 | Roosenstein et al. | Mar. 13, 1940 |
| 2,300,189 | Wolff | Oct. 27, 1942 |
| 2,492,542 | Stone | Dec. 27, 1949 |
| 2,552,136 | Beurtheret | May 8, 1951 |
| 2,573,380 | Ambrose et al. | Oct. 30, 1951 |
| 2,717,355 | Louden | Sept. 6, 1955 |

OTHER REFERENCES

Electric Analog Computers (Korn and Korn), 1952; pages 245 and 256.

Tele-Tech & Electronic Industries (Levenstein), October 1953; pages 76–78.